United States Patent
Furlong et al.

(10) Patent No.: US 8,130,786 B2
(45) Date of Patent: Mar. 6, 2012

(54) MULTI-RATE BACKPLANE TRANSCEIVER

(75) Inventors: Michael Furlong, Rancho Santa Margarita, CA (US); Vivek Telang, Austin, TX (US)

(73) Assignee: Broadcom Corporation, Irvine, CA (US)

(*) Notice: Subject to any disclaimer, the term of this patent is extended or adjusted under 35 U.S.C. 154(b) by 582 days.

(21) Appl. No.: 12/112,785

(22) Filed: Apr. 30, 2008

(65) Prior Publication Data
US 2009/0232151 A1 Sep. 17, 2009

Related U.S. Application Data

(60) Provisional application No. 61/036,863, filed on Mar. 14, 2008.

(51) Int. Cl.
*H04L 12/56* (2006.01)
(52) U.S. Cl. ...................................................... 370/463
(58) Field of Classification Search .................. 370/229, 370/230, 231, 235, 252, 400, 401, 420, 463; 709/223–226, 232, 233
See application file for complete search history.

(56) References Cited

U.S. PATENT DOCUMENTS

| | | | |
|---|---|---|---|
| 4,516,122 A * | 5/1985 | Tomikawa | 370/447 |
| 5,644,270 A * | 7/1997 | Moyer et al. | 331/34 |
| 6,717,997 B1 * | 4/2004 | Cranford et al. | 375/354 |
| 7,356,047 B1 * | 4/2008 | Mahalawat et al. | 370/469 |
| 2003/0012158 A1 * | 1/2003 | Jin et al. | 370/335 |
| 2008/0170586 A1 * | 7/2008 | Huff et al. | 370/463 |
| 2008/0225841 A1 * | 9/2008 | Conway et al. | 370/389 |
| 2008/0225879 A1 * | 9/2008 | Powell | 370/445 |
| 2009/0097401 A1 * | 4/2009 | Diab | 370/230 |

* cited by examiner

*Primary Examiner* — Hassan Phillips
*Assistant Examiner* — Duc Duong
(74) *Attorney, Agent, or Firm* — Brake Hughes Bellermann LLP

(57) ABSTRACT

An apparatus is disclosed that includes first transceiver circuitry adapted for transmitting and receiving Ethernet data over a network using a first Ethernet communication protocol at a first data rate, second transceiver circuitry adapted for transmitting and receiving Ethernet data over a network using a second Ethernet communication protocol at a second data rate; and third transceiver circuitry adapted for transmitting and receiving Ethernet data over a network using a third Ethernet communication protocol at a third data rate.

30 Claims, 7 Drawing Sheets

MULTI-RATE BACKPLANE TRANSCEIVER

CROSS REFERENCE TO RELATED APPLICATIONS

This application claims the benefit under 35 U.S.C. §119(e) of U.S. Provisional Patent Application Ser. No. 61/036,863, filed on Mar. 14, 2008. The entire disclosure of U.S. Provisional Application 61/036,863 is incorporated by reference herein in its entirety.

TECHNICAL FIELD

This disclosure relates to the transfer of information over a network and, in particular, to a multi-rate backplane transceiver.

BACKGROUND

The term "Ethernet" refers to a family of local area network (LAN) implementations that includes several principal categories: (i) Ethernet and IEEE 802.3 are LAN specifications that operate at about 10 megabits per second (Mbps) over, for example, thick and thin coaxial cable, or twisted pair cable; (ii) 100-Mbps Ethernet, a single LAN specification that operates at 100 Mbps over fiber and twisted-pair cables (alternatively referred to as Fast Ethernet because it is 10 times faster than the older 10 Mbps standard) and is defined in IEEE standard 802.3u which is incorporated herein by reference in its entirety; (iii) 1000-Mbps Ethernet, a single LAN specification (alternatively referred to as Gigabit Ethernet, GbE, or GigE) that operates at 1000 Mbps or 1 gigabits per second (Gbps) over fiber and twisted-pair cables; and 10 Gigabit Ethernet, a single LAN specification (alternatively referred to a 10 GbE or 10 GigE) that operates at 10 Gbps over fiber or twisted-pair cables. Ethernet has survived as an essential media technology because of its tremendous flexibility and its relative simplicity to implement and understand. Although other technologies are touted as possible replacements, network managers continually turn to Ethernet and its derivatives as effective solutions for a range of implementation requirements.

Differences between Ethernet and IEEE 802.3 LANs are subtle. Ethernet provides services corresponding to Layers 1 and 2 of the OSI reference model. IEEE 802.3 specifies the physical layer (Layer 1) and the channel-access portion of the link layer (Layer 2), but does not define a logical link control protocol. Both Ethernet and IEEE 802.3 are typically implemented in hardware. The physical manifestation of these protocols is either an interface card in a host computer or circuitry on a primary circuit board within a host computer. IEEE 802.3 specifies several different physical layers, whereas Ethernet defines only one. Each 802.3 physical layer can be associated with a name that summarizes characteristics of the physical layer. For example, 10Base2 is the name of a physical layer that is similar to Ethernet and that has characteristics including a 10 Mbps data rate, a baseband signaling method, a maximum segment length of 500 feet, a 50-ohm coax connection media, and a bus topology. The moniker 1000BASE-X is used in industry to refer to a physical device (PHY) layer that transmits data at a rate of 1 Gbps over fiber. 1000BASE-T refers to a physical layer that transmits data at a rate of 1 Gbps over twisted pair copper wires. 10GBASE-R refers to a physical layer that transmits data at a rate of 10 Gbps over fiber, and 10GBASE-T refers to a physical layer that transmits data at a rate of 10 Gbps over twisted pair copper wires.

As Ethernet standards have evolved over time, the speed at which data is transmitted via an Ethernet network has increased, usually by a factor of ten as a new standard is developed.

SUMMARY

The details of one or more implementations of systems and methods for implementing a physical device layer for Ethernet network communication network at one of three possible data rates are set forth in the accompanying drawings and the description below. Other features will be apparent from the description and drawings, and from the claims.

DETAILED DESCRIPTION

As explained in further detail below, a network device for coupling a processing device to an Ethernet-based computer network is disclosed. The network device can include transceiver circuitry that is used for transmitting and receiving Ethernet data over an Ethernet network at a first data rate, at a second data rate, and at a third data rate. For example, the network device may include circuitry for transmitting and receiving Ethernet data at about 1.0 Gbps, 2.5 Gbps, and 10 Gbps. The network device may use the same physical layer device(s) for transmitting and receiving the Ethernet data at the different data rates.

Figure 1:
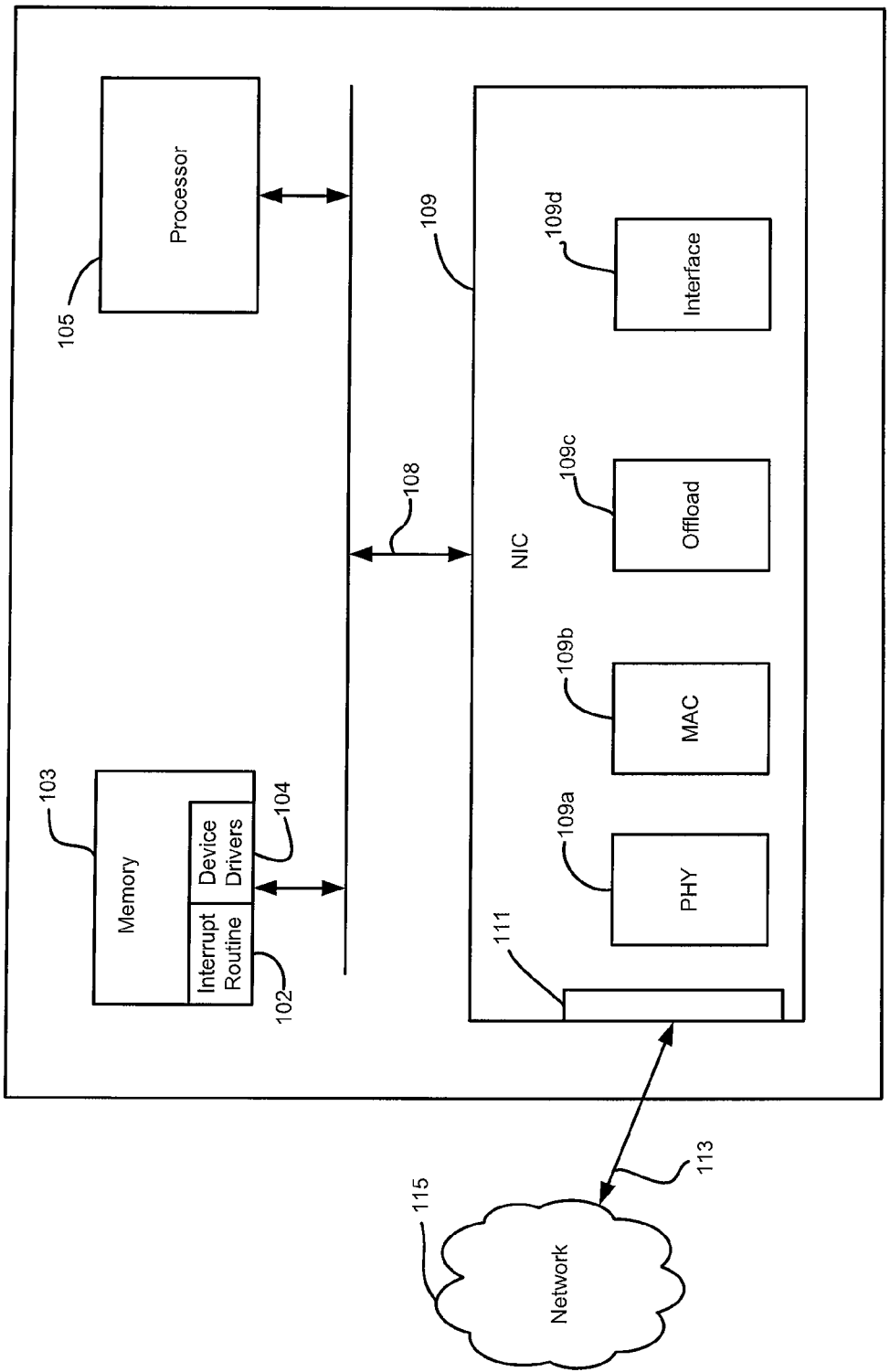
FIG. 1 is a block diagram of a system that includes a network interface card over which data can be sent to and received from a network.

FIG. 1 is a block diagram of an exemplary system 100 that includes a memory block 103, a processor 105, and a network interface card/circuitry (NIC) 109. The system 100 may be, for example, a personal computer, a blade server, a network server system serving one or more clients by providing access to the network 115. The NIC 109 may include a physical network interface layer (PHY) 109a, a media access controller (MAC) 109b, an offload engine 109c, and an interface block 109d. Interrupt routines 102 may be stored within the memory block 103. The interrupt routines 102 may include code and/or data to allow the processor 105 to execute instructions in response to a hardware or software interrupt signals. Various hardware devices may also need device drivers, such as, for example, the device drivers 104, and the device drivers 104 may be stored in the memory block 103. The device drivers 104 may include code and/or data to allow communication between the processor 105 and hardware, such as, for example, the NIC 109 across a bridge 108. The processor 105 may communicate with the memory block 103 and the interface block 109d, and the interface block 109d may provide, for example, a host interface to the NIC 109. The NIC 109 may be connected to a network 115 via a network connector 113, for example, a wire, a backplane trace, cable, or optical fiber. In this manner, the NIC 109 may transmit data to the network 115 and receive data from the network 115.

The memory block 103 may include suitable logic, circuitry, and/or code that may be adapted to store a plurality of control, status, and/or data information. Other processing blocks, such as, for example, the processor 105, may access the information stored in memory block 103. For example, the interface block 109*d* may include management and control registers that may be used to control the operation of the NIC 109. The processor 105 may include suitable logic, circuitry, and/or code that may be adapted to process data that may be read from, for example, the memory block 103. The processor 105 may store data in the memory block 103, and/or communicate data, status, and/or commands with other devices, such as, for example, the NIC 109.

The interface block 109*d* may include suitable logic, circuitry, and/or code that may be adapted to manage input/output of data from the processor 105 to the NIC 109. This may allow, for example, the faster devices such as the memory 103 and the processor 105 to be separated from slower peripheral devices, such as, for example, the NIC 109. Accordingly, the faster devices may not be bottlenecked while waiting for slower devices to transfer data. This may occur, for example, when a host processor, such as the processor 105, communicates with the NIC 109 with regard to data to be transmitted to, or received from, the network 115.

The PHY 109*a* may include suitable logic, circuitry, and/or code that may be adapted to interface to the network 111. The PHY 109*a* may establish a link to other network nodes using, for example, auto-negotiation and/or parallel detection. The MAC 109*b* may include suitable logic, circuitry, and/or code that may be adapted to properly format data for packet transmission on, for example, the network 115, which can include an Ethernet network. The MAC 109*b* may also be adapted to receive data from the Ethernet network and to remove the Ethernet network related frame information so that higher-level protocols may extract desired payload data from the received frame. The offload engine 109*c* may include suitable logic, circuitry, and/or code that may be adapted to process protocol layers above the OSI layer 2, such as, for example, TCP and/or IP.

In operation, the NIC 109 may communicate data with the network via a transceiver interface 111. The NIC 109 may receive, for example, Ethernet network data via the transceiver interface 111 and transmit Ethernet data to, for example, the Ethernet network via the transmit interface 111. In particular, transceiver interface 11 of the PHY 109*a* may include a plurality of connectors over which signals can be set and received to transmit and receive data to and from the network 115. When transmitting data to the network, the processor 105 may, for example, communicate data stored in the memory block 103 to the NIC 109 via the interface block 109*d*. The NIC 109 may process the data from the processor 105, and form appropriate frames for transmission to, for example, the Ethernet network. For example, the NIC 109 may generate Ethernet protocol information that may include, for example, a preamble, source and destination addresses, and/or error detection information.

The NIC 109 may also receive data from the Ethernet network via the transceiver interface 111. The NIC 109 may remove network related information, for example, the Ethernet protocol information, and may communicate the remaining data to, for example, the processor 105 via, for example, the interface block 109*d*. The processor 105 may process the received frame to retrieve data that may have been sent by another application on the network. The processor 105 may save the processed data in the memory block 103.

In one implementation, the NIC 109 may be designed as a stand-alone device. In another implementation, the NIC 109 may be integrated into a chipset or the processor 105 of the system 100. In another implementation, the MAC 109*b* may be integrated into a chipset or the processor 105, and the MAC may communicate with an external PHY.

Figure 2:
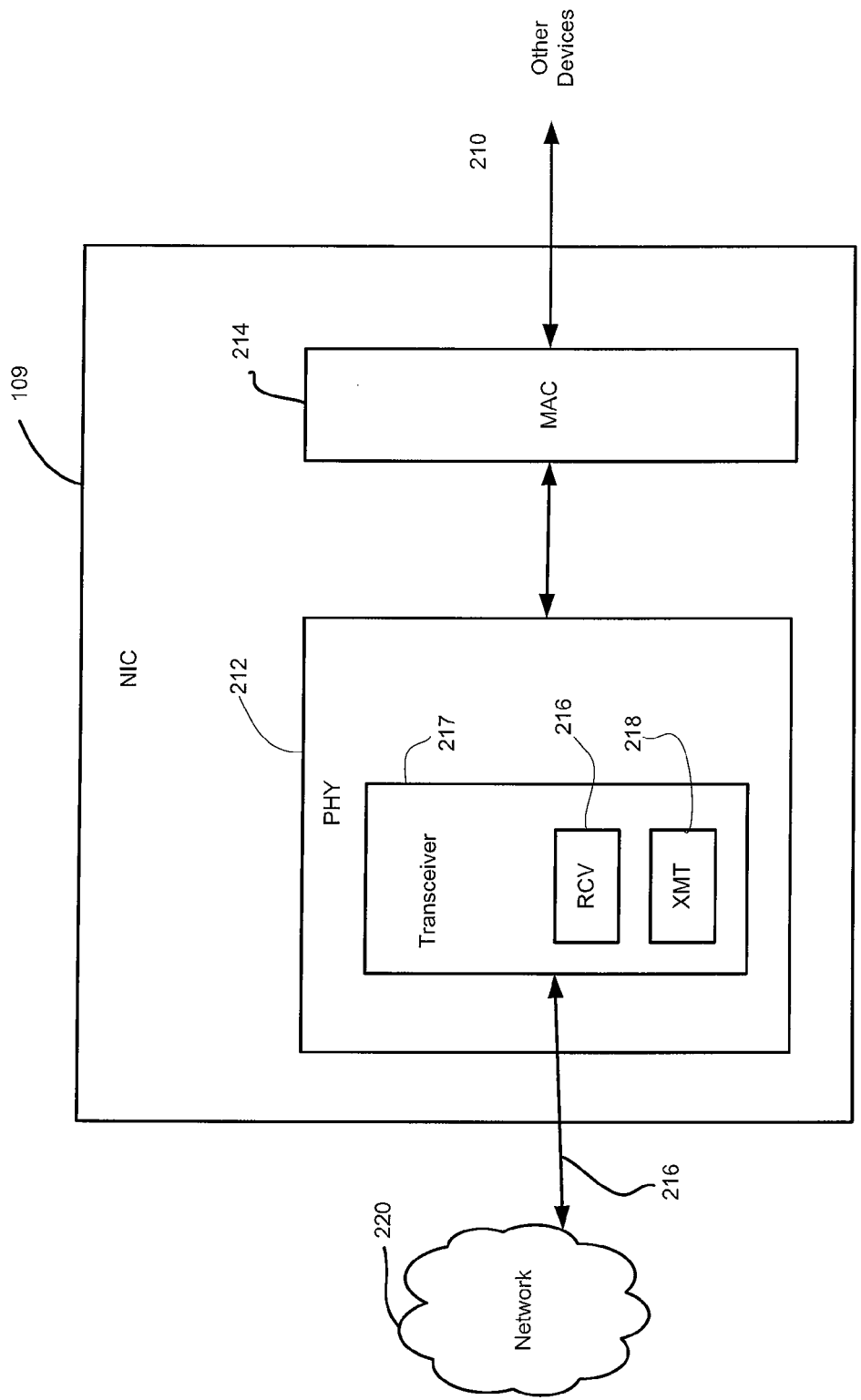
FIG. 2 is a block diagram of a system that includes a network interface card having a MAC and a PHY over which data can be sent to and received from a network.

FIG. 2 is a block diagram of an exemplary NIC 109 that may include a physical network interface layer (PHY) 212 and a media access controller (MAC) 214. The PHY 212 may include suitable logic, circuitry, and/or code that may be adapted to interface to a network 220. The PHY 212 may include transceiver circuitry 217, which may include a transmit interface 216 and a receive interface 218. The MAC 214 may include suitable logic, circuitry, and/or code that may be adapted to properly format data for packet transmission on, for example, an Ethernet network 220. The MAC 214 may also be adapted to receive data from the Ethernet network and to remove the Ethernet network related frame information so that higher-level protocols may extract desired payload information from the received frame.

In operation, the PHY 212 may communicate data to the Ethernet network via the transceiver 217. The PHY 212 may receive Ethernet network data via the receive interface 218, and transmit data to the Ethernet network via the transmit interface 216. The MAC 214 may receive data from, for example, the processor 105 (FIG. 1), and form appropriate frames for the Ethernet network, for example. The MAC 214 may communicate the frames to the PHY 212 via the interface 213 between the PHY 212 and the MAC 214. Additionally, the MAC 214 may receive data from the network 220 via the PHY 212. The MAC 214 may remove the network related information, for example, the Ethernet protocol information, and may communicate the remaining payload data to, for example, the processor 105. The payload data may be communicated via, for example, a bus interface 210 (e.g., a PCI Express bus interface). The processor 105 may process the received frame to retrieve data that may have been sent by another application on the network.

Figure 3:
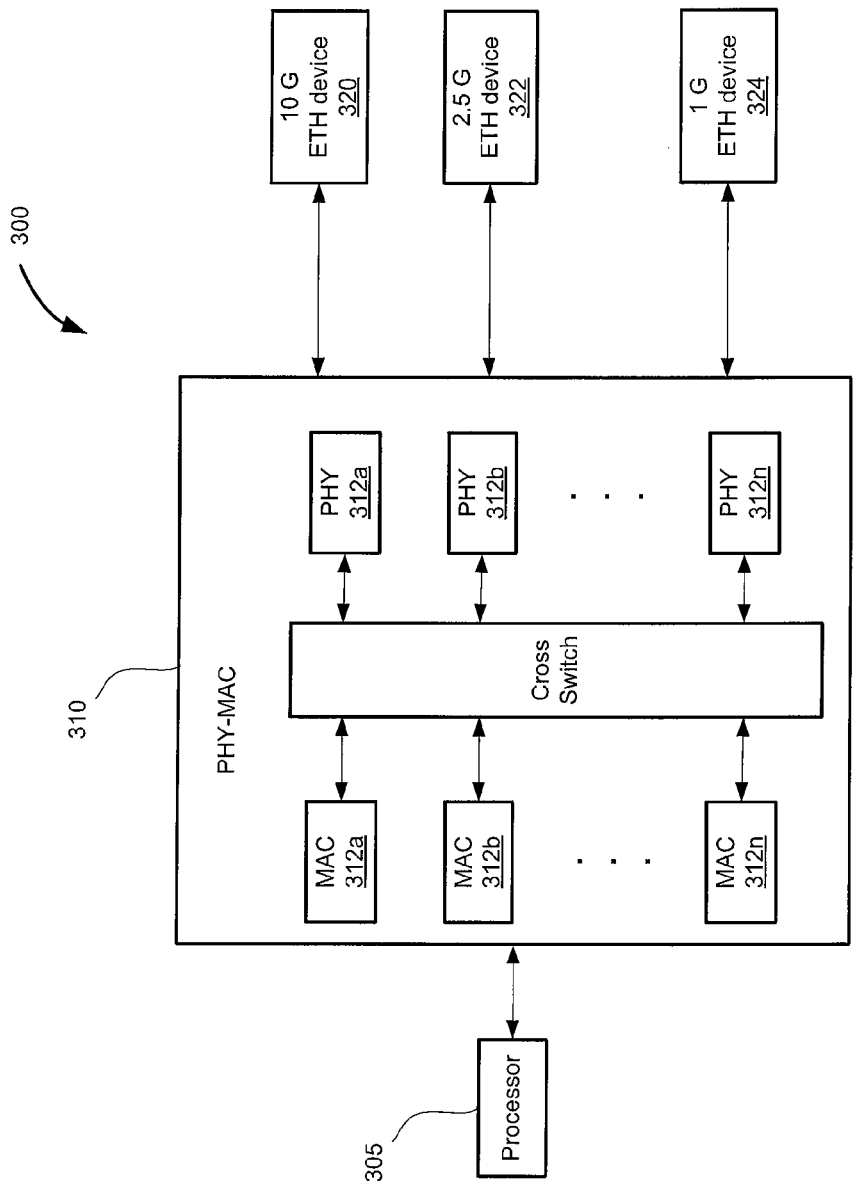
FIG. 3 is a block diagram of a system that includes a PHY-MAC device coupled to several Ethernet devices.

FIG. 3 is a block diagram of an exemplary computer system with PHY-MAC devices that may each communicate with one or more network devices that can operate at different data rates. The system 300 can include a processor 305 and a PHY-MAC device 310. The processor 305 may be similar in functionality to the processor 105. The PHY-MAC device 310 may include a plurality of MACs 312*a*, 312*b* . . . 312*n*, a cross-switch 314, and a plurality of PHYs 316*a*, 316*b*, . . . 316*n*. One of the pluralities of MACs 312*a*, 312*b* . . . 312*n* may be able to be connected to a subset of the PHYs 316*a*, 316*b* . . . 316*n*. The PHY-MAC device 310 may be connected to at least one Ethernet device, for example, one of the Ethernet devices 320, 322, and 324. Ethernet devices 320, 322, and 324 can be any device that communicates with the system 300 through the exchange of Ethernet data packet. For example, Ethernet devices 320, 322, and 324 can include, for example, switches, routers, and server blades.

The PHY-MAC device 310 may be connected to, for example, the Ethernet devices 320, 322, and 324 via the PHYs 316*a*, 316*b*, and 316*n*. The Ethernet device 320 may be, for example, rated to handle data at about 10 Gbit/second of less, while the Ethernet device 322 may be, for example, rated to handle data at about 2.5 Gbit/second or less, and the Ethernet device 324 may be, for example, rated to handle data at 1 Gbit/second or less. The different Ethernet devices 320, 322 and 324 may be connected to the system 300 via cables or connectors that can have the same physical form factor or that have different physical form factors. Accordingly, a cable or connector that is used to connect the system 300 to one of the Ethernet devices may or may not be used to connect the system to another Ethernet device.

In operation, network cables can be plugged into the PHY-MAC device 310 to connect the PHY-MAC device 310 to Ethernet devices 320, 322, and 324. The system 300 may be configured to determine automatically which PHY and MAC to use to provide network communication capability. The determination of which PHY and MAC to use may be based on a determination of the data speed capability of the network device 320, 322, or 324 to which the system 300 is connected and with which the system is to communication. For example, if the system determines that the PHY-MAC 310 is connected to a 10 Gbit/sec network device 320, then the system 300 may select a particular MAC 312a and PHY 316a to provide communication capability based on the ability of the selected MAC 312a and PHY 316a to handle data at a rate of 10 Gbit/sec.

In one implementation, the system can determine to use a PHY 316n and a corresponding MAC 312n as the default PHY and MAC to provide network access. For example, the PHY 316n and MAC 312n may be able to provide only a minimum level of bandwidth, e.g., the ability to handle communications at a rate of up to 1.0 Gbit/sec. However, if high speed network activity is auto-detected from the Ethernet device 320 via the PHY 316a, then a cross-switch 314 may be configured to use a corresponding MAC 312a to access the provide high speed network access and communication capability. It may be desirable to use the PHY 316a to access the network since the PHY 316a may be connected to the Ethernet device 320, which may be rated to handle data at 10 Gbit/second.

The processor 305 may use auto-detection of network activity from the Ethernet device 320 to select and activate one or the PHY's 316a, 316b, or PHY 316n. This may optimize throughput of data into and out of out the system 300 via a PHY layer with sufficient processing capability to match the data rate of the Ethernet device 320. In one implementation, the processor 305 can auto-detect activity of a network device 320 coupled to the system and select an appropriate PHY with which to communicate with the network device. However, other designs may be used to select a PHY based on auto-detection of network activity, such as, for example, a state machine, a protocol offload block, or a host interface.

In some implementations a one-to-one correspondence between particular MACs and particular PHYs can be used, however, in other implementations, the plurality of MACs 312a, 312b ... 312n may each be able to support a range of data rates. Accordingly, a MAC may be able to support at least one of a plurality of PHYs, where each PHY may support at least one data rate. Accordingly, the cross switch 314 may be able to connect a MAC to one of a plurality of PHYs. In another implementation, instead of using a cross switch 314, the PHY-MAC 310 may include a plurality of MACs 312a, 312b ... 312n and a plurality of PHYs 316a, 316b ... 316n, where each MAC may be directly connected to a PHY.

Figure 4A:
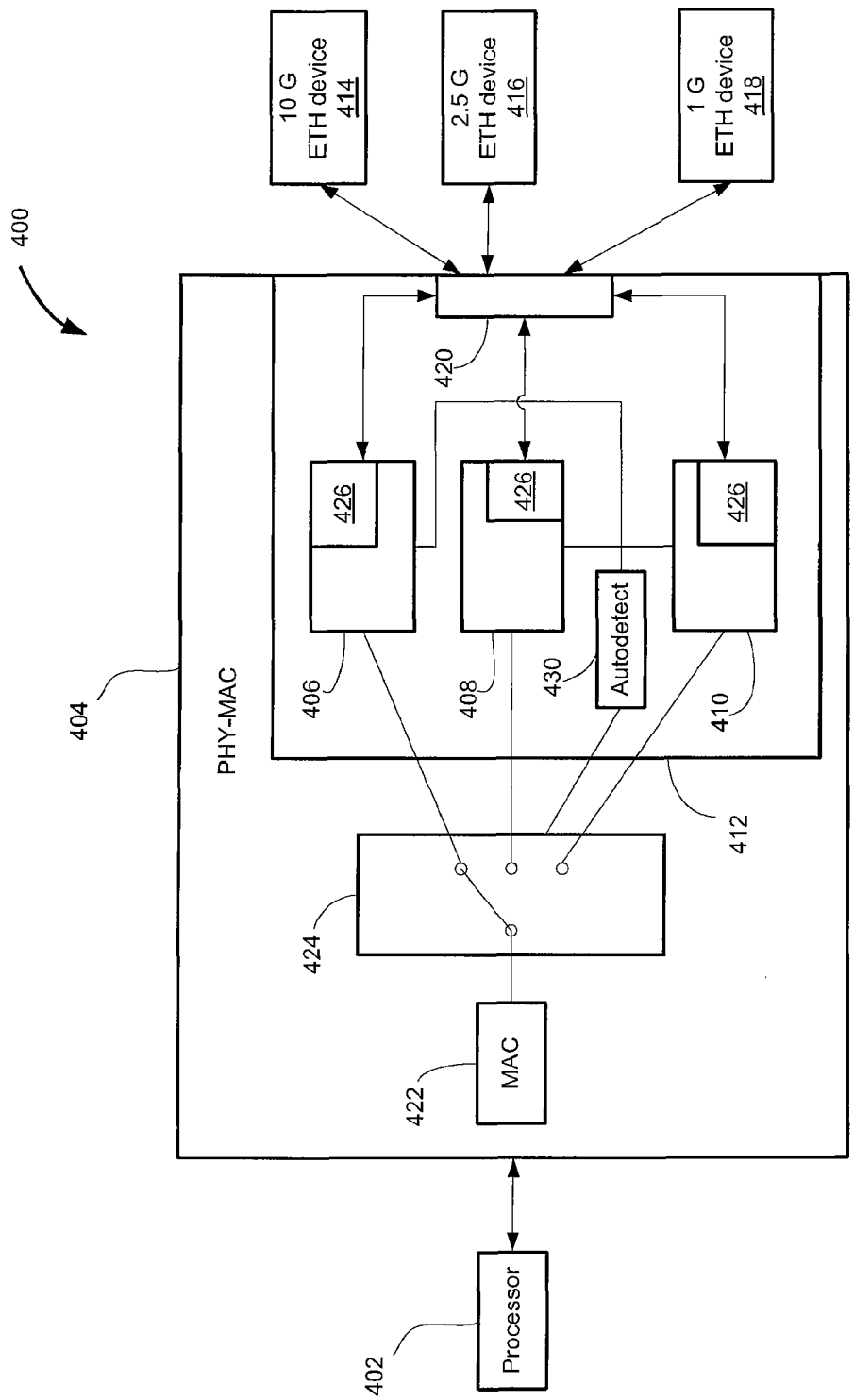
FIG. 4A is a block diagram of a system that includes a PHY-MAC device coupled to several Ethernet devices.

FIG. 4A is a block diagram of a system 400 having first, second, and third transceiver circuitries that can be used to transmitting and receiving Ethernet packets with a network device. The system can include a processor 402 and a PHY-MAC device 404, which may include first transceiver circuitry 406, second transceiver circuitry 408, and third transceiver circuitry 410. In one implementation, the first transceiver circuitry 406, the second transceiver circuitry 408, and the third transceiver circuitry 410 can all be part of a single PHY 412. The PHY-MAC device 404 may be connected to one or more Ethernet devices 414, 416, or 418 via a port 420 in the PHY device 412. In one implementation, the port 420 can include a plurality of connectors adapted for transmitting and receiving Ethernet data between the PHY-MAC 404 and the Ethernet device(s) 414, 416, and/or 418 and the same form factor can be used to connect a cable to the PHY 404 for transmitting the Ethernet data between any of first, second, or third transceiver circuitries 406, 408, or 410 and the Ethernet device(s) 414, 416, and/or 418. In another implementation, the PHY-MAC 404 can include a plurality of ports, each having a particular form factor and having a unique set of connectors that are adapted for transmitting Ethernet data between a particular transceiver circuitry 406, 408, or 410 and the Ethernet device(s) 414, 416, and/or 418.

A MAC 422 can be coupled to the first, second, and third transceiver circuitries 406, 408, and 410 via a switch 424 that may include suitable logic and/or circuitry to enable transfer of data between the MAC 422 and the transceiver circuitries 406, 408, and 410. The switch can be operable to select which of first, second, or third transceiver circuitries 406, 408, and 410 is used to transmit and receive Ethernet data between the PHY and an Ethernet device 414, 416, or 418 that is coupled to the PHY 412. Whether the first, second, or third transceiver circuitries 406, 408, and 410 is selected to transceiver data may depend on, for example, an operating data rate of the Ethernet device to which the PHY is coupled. For example, the first transceiver circuitry 406 may be connected via the port 402 to an Ethernet device 414 that is rated to handle data rates of 10 Gbit/second, while the second transceiver circuitry 408 may be connected via the port 402 to an Ethernet device 416 that is rated to handle data rates of 2.5 Gbit/second, and the third transceiver circuitry 410 may be connected via the port 402 to an Ethernet device 418 that is rated to handle data rates of 1 Gbit/second.

The first transceiver circuitry 406, the second transceiver circuitry 408, and the third transceiver circuitry 410 each may include a serializer-deserializer (SerDes) 426, which may include suitable logic, circuitry, and/or code adapted to receive parallel data and serialize it for transmission over a serial line (e.g., an Ethernet cable connected between the PHY 412 and an Ethernet device 414, 416, or 418) and to receive serial data and convert it to parallel data. The parallel data may be transferred to and from, for example, the MAC 422 via the switch 424. Accordingly, the SerDes 426 may allow the PHY/MAC device 404 to process multiple lanes of data.

An auto-detector block 430 may include suitable logic and/or circuitry to enable auto-detection of an operating data rate of an Ethernet device to which the PHY-MAC is connected and suitable logic and/or circuitry to enable configuring of the switch 424 to select, based on the detected operating data rate, one of the first, second, or third transceiver circuitries for transmitting Ethernet data between the connected Ethernet device and the PHY 412. In one implementation, the auto-detector block 430 may detect an operating data rate of the connected Ethernet device by sensing the energy received from the connected device. If the sensed energy is above a pre-determined first threshold level, then the first transceiver circuitry 406 can be selected. If the sensed energy is below the pre-determined first threshold level but above a pre-determined second threshold level, then the second transceiver circuitry 408 can be selected. If the sensed energy is below the pre-determined second threshold level, then the third transceiver circuitry 410 can be selected.

Upon auto-detection of an operating data rate of a connected Ethernet device, the auto-detector block 430 may configure the data switch 424 such that the switch may transfer data between the MAC 422 and a selected transceiver circuitry of the PHY 412. For example, the default connection upon power-up of the NIC 109 may be between the MAC 422 and the circuitry 410. In other implementations, the processor 402 may generate an interrupt to and then may then execute an interrupt routine (e.g., part of the interrupt routines 102 stored on the memory block 103) to configure appropriately the switch 424.

Figure 4B:
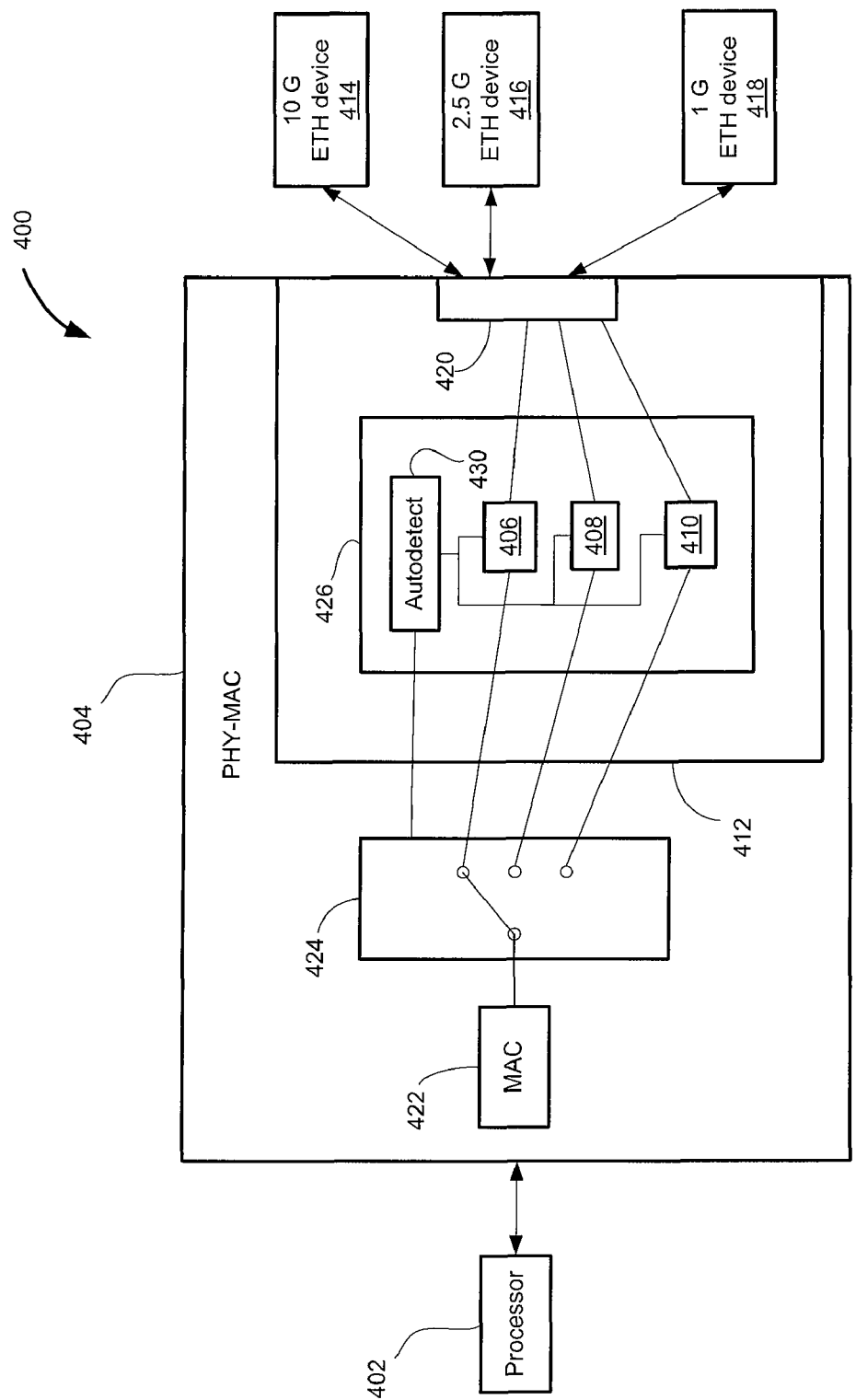
FIG. 4B is a block diagram of a system that includes a PHY-MAC device coupled to several Ethernet devices.

In another implementation, shown in FIG. 4B, the SerDes device 426 can include the first transceiver circuitry 406, the second transceiver circuitry 408, and the third transceiver circuitry. The autodetect block 430 can be included in the SerDes device 426 or can be external to the SerDes device. Based on detection of an operational data rate at which an Ethernet device 414, 416, or 418 operates, the autodetect block 430 can cause the switch 424 to select one of the first, second, or third transceiver circuitries 406, 408, or 410 for communication with the connected Ethernet device.

The first, second, and third transceiver circuitries 406, 408, and 410 can be used to transmit and receive Ethernet data to one or more of the Ethernet devices 414, 416, and 418 according to particular Ethernet communication protocols. For example, the first transceiver circuitry 406 can be used to transmit and receive Ethernet data according to a 10 Gigabit Ethernet standard protocol, as defined, for example, in the IEEE Standard 802.3ae-2002, including variations, improvements, and particular implementations on this standard. Particular implementations of the IEEE 802.3ae-2002 Standard include, for example, the 802.3ae-2002-SR, -LR, -ER, and -ZR Standards that are used for communication over optical fiber, which can be known collectively as 10GBASE-R protocols. The 10GBASE-R protocols are generally used for communication over optical fiber using Ethernet framing and use 64B/66B encoding, which transforms 64-bit data into 66-bit line code, to achieve DC balance. Because of the 64B/66B encoding the 10 Gigabit Ethernet data is transmitted at a line rate of about 10 Gb/s*66/64=10.3125 Gigabits per second.

Other 10 Gigabit Ethernet implementations include the 10GBASE-CX4 (also known by its working group name, 802.3ak), which is used for communications over copper cable with four lanes of data, and 10GBASE-Kx protocols or "backplane Ethernet" (also known by its working group name, 802.3ap) standard for use, for example, with blade servers and routers/switches with upgradable line cards using communications over copper cable. The 10GBASE-KR implementation of backplane Ethernet uses the same coding as the 10GBASE-R Ethernet and communicated over one lane. The 10 Gbase-KX4 implementation of backplane Ethernet is similar to the 10GBase-CX4 protocol and uses communication over four lanes.

In another example, the third transceiver circuitry 410 can be used to transmit and receive Ethernet data according to a 1 Gigabit Ethernet standard protocol, as defined, for example, in the IEEE 802.3z standard, which is commonly referred to as a 1000BASE-X protocol, where -X refers to either -CX, -SX, -LX, -ZX, -LH, or -BX10. These 1000BASE-X protocols use 8B/10B encoding, which transforms 8-bit data into 10-bit line code, such that the line rate for the protocol is about 1.25 Gigabits per second.

In another example, the second transceiver circuitry 408 can be used to transmit and receive Ethernet data according to a 2.5 Gigabit Ethernet standard protocol. The 2.5 Gigabit Ethernet standard can be derived, for example, from the XAUI standard 10 Gigabit Ethernet protocol. XAUI, which is a concatenation of the Roman numeral X, meaning ten, and the initials of "Attachment Unit Interface," is a protocol designed to the IEEE 802.3ae 10 Gigabit Ethernet standard and is intended as a convenient 16-pin replacement for the 72-pin 10 Gigabit Media-Independent Interface ("XGMII") also used to route 10 Gigabit Ethernet signals on a circuit board. In the XAUI protocol, four lanes of serial Ethernet traffic are operated in parallel to form a 10 Gigabit per second channel. Each lane carries Ethernet data at a data rate of 2.5 Gbit/s, such that the total combine rate of the four lanes is 10 Gbit/s. Traffic on each lane is transmitted with 8B/10B encoding, such that the line rate for each lane of the protocol is about 3.125 Gigabits per second.

Figure 5:
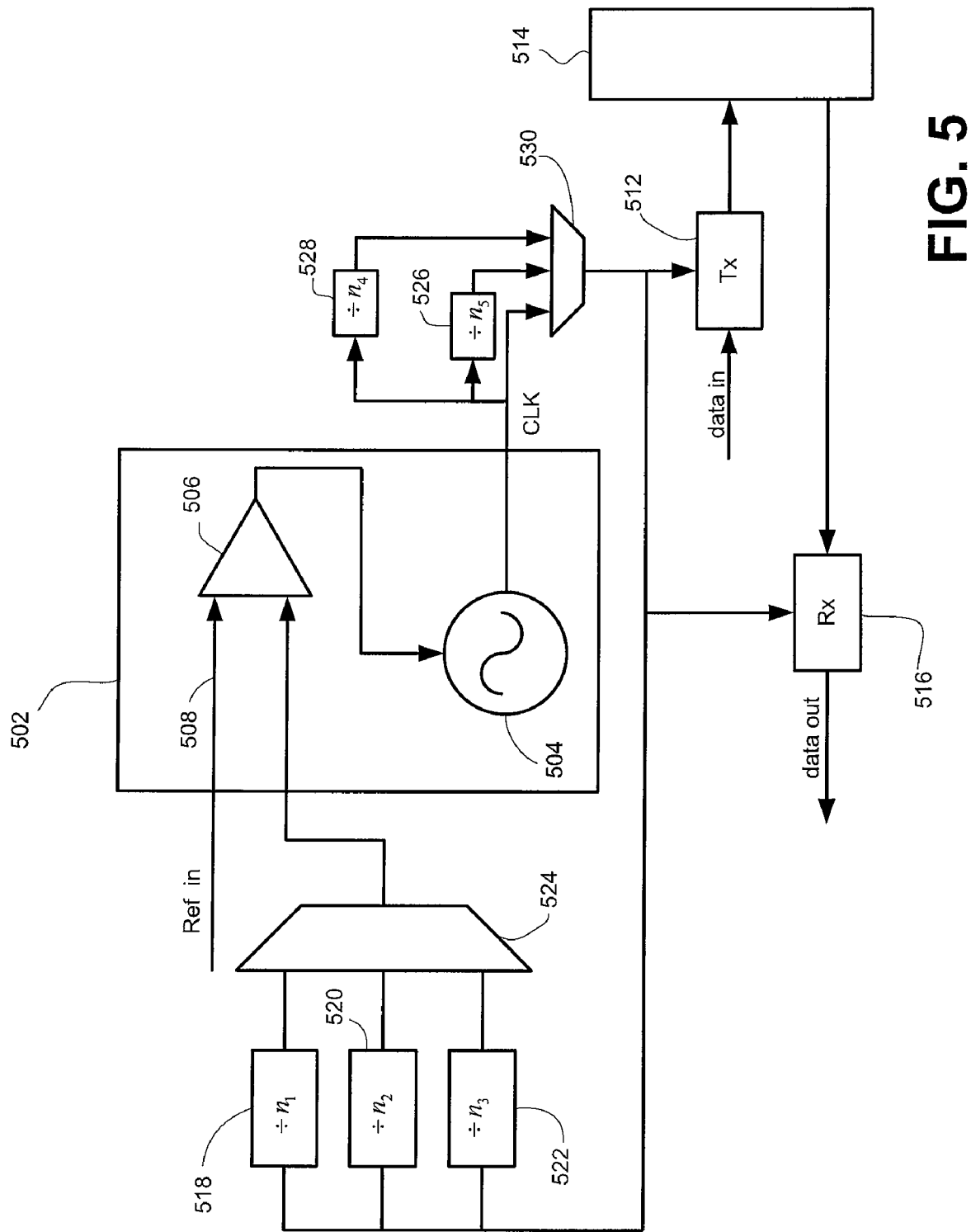
FIG. 5 is a block diagram of a system that can be used to transmit and receive Ethernet data at three different data rates.

FIG. 5 is a block diagram of a system 500 that can be used to transmit and receive Ethernet data at three different data rates. The system 500 can include and phase-locked loop (PLL) 502, which can include a voltage controlled oscillator (VCO) 504. The VCO 504 receives an input signal and generates and output signal based on the input signal. The PLL 506 also can include a comparator 506 that receives an input signal from a multiplexer 524 and from a reference input 508. The reference input can supply a reference signal having a frequency, for example, of 156.25 MHz. Based on a comparison of the reference input signal 508 and the input signal received from the multiplexer 524, the comparator can generate a signal that can be used as the input signal to the VCO 504.

The output of the VCO can be used as a clock signal to pace the transmission of data that is fed from a buffer into transmission circuitry 512, and the data can be transmitted from the transmission circuitry 512 over an interface 514 at a rate equal to or based on a rate of the clock signal. The output of the VCO also can be used as a clock signal to pace the reception of data that is fed from the interface 514 into reception circuitry 516, and the data can be received out of the reception circuitry 516 at a rate equal to or based on a rate of the clock signal.

The rate of the clock signal can be controlled by feeding the clock signal into one of three divide by circuit blocks, 518, 520, and 522, each of which can divide the rate of the clock signal by a different amount. For example, the divide by n, block 518 can divide the clock signal rate by 66, such that if the clock signal is about 10.3125 GHz and is being used to operate transceiver circuitry of 406 for transmitting and receiving Ethernet data at a data rate of about 10 Gbit/s using, e.g., a 10GBASE-R protocol, then the divided clock signal that is output from block 518 will have a rate that is equal to the reference signal rate when rate of the clock signal is correctly adjusted to equal 10.3125 GHz. Similarly, the divide by $n_2$ block 520 can divide the clock signal rate by 20, such that if the clock signal is about 3.125 GHz and is being used to operate transceiver circuitry of 408 for transmitting and receiving Ethernet data at a data rate of about 2.5 Gbit/s using, e.g., a XAUI protocol, then the divided clock signal that is output from block 520 will have a rate that is equal to the reference signal rate when rate of the clock signal is correctly adjusted to equal 3.125 GHz. Likewise, the divide by $n_3$ block 522 can divide the clock signal rate by 8, such that if the clock signal is about 1.25 GHz and is being used to operate transceiver circuitry of 410 for transmitting and receiving Ethernet data at a data rate of about 1.0 Gbit/s using, e.g., a 1000BASE-X protocol, then the divided clock signal that is output from block 520 will have a rate that is equal to the reference signal rate when rate of the clock signal is correctly adjusted to equal 1.25 GHz. Thus, in one implementation, the same PLL and VCO can be used to supply a clock signal to the first, second, and third transceiver circuitries, 406, 408, and 410, respectively. In another implementation, separate PLL's can be used to generate the clock signals that are used to pace the first, second, and third transceiver circuitries, 406, 408, and 410.

In one implementation, when a single VCO is used to generate the signal that is output from the PLL 502 and used to provide a clock signal to the transmission circuitry 512 and receiver circuitry 516, the signal output from the VCO may have to be divided before it is used to pace the transmission circuitry 512 and receiver circuitry 516. For example, when pacing the first transceiver circuitry 406 at a line rate of 10.3125 GHz the signal may not have to be divided, but when pacing the second transceiver circuitry 408 at a line rate of 3.125 GHz the signal output from the VCO 504 may be divided by a divide by block 526 that divides the rate of the signal by a factor of three, and when pacing the third transceiver circuitry 410 at a line rate of 1.25 GHz the signal output from the VCO 504 may divided by a divide by block 528 that divides the rate of the signal by a factor of eight. Thus, the signal output from the VCO 504 can be fed directly to an input of a multiplexer (MUX) 530, to the divide by blocks 526 and 528, whose outputs are fed into the MUX 530, and the MUX can be controlled to select an output signal that is appropriate to clock the selected transceiver circuitry 406, 408, or 410.

Therefore, the VCO must be able to produce a 10.3125 GHz signal that can be used directly to clock the first transceiver circuitry 406, a 10 GHz signal that can be fed into the divide by 8 block 528 that creates a 1.25 GHz signal that can be used to clock the third transceiver circuitry 410, and a 9.375 GHz that can be fed into the divide by 3 block 526 that creates a 3.125 GHz signal that can be used to clock the second transceiver circuitry 408. Thus, the VCO must be able to perform well over a range of nearly 1 GHz or about ±5% of its center operating frequency. To cause the VCO to output the different frequencies (e.g., 10.3125 GHz, 10 GHz, and 9.375 GHz), different input reference voltage signals can be fed into the VCO.

FIG. 5 is a block diagram of a single-channel chassis 500 having a backplane 512 that can be used with a PH-MAC device having the ability to communicate at several different data rtes. In one implementation, the chassis 500 and backplane 512 can be used in a blade environment of a computer system. The backplane 512 can include one or more connectors 514 (e.g., to plug NIC's into, and operating at, for example, 1 Gbit/s, 2.5 Gbit/sec, or 10 Gbit/s) attached to backplane circuitry, including e.g., a plurality of wires, that make up a single channel 16. For example, four wires that include two twisted pair pathways can use used to make up a single channel. A first twisted pair pathway can include two wires (TX+ and TX−) for transmitting serial data, and a second twisted pair pathway can include two wires (RX+ and RX−) for receiving serial data. NIC's can be plugged into the connectors 514 and can route data from the backplane 512 to processors connected to the NIC's, e.g., processors in a blade server environment.

Figure 6:
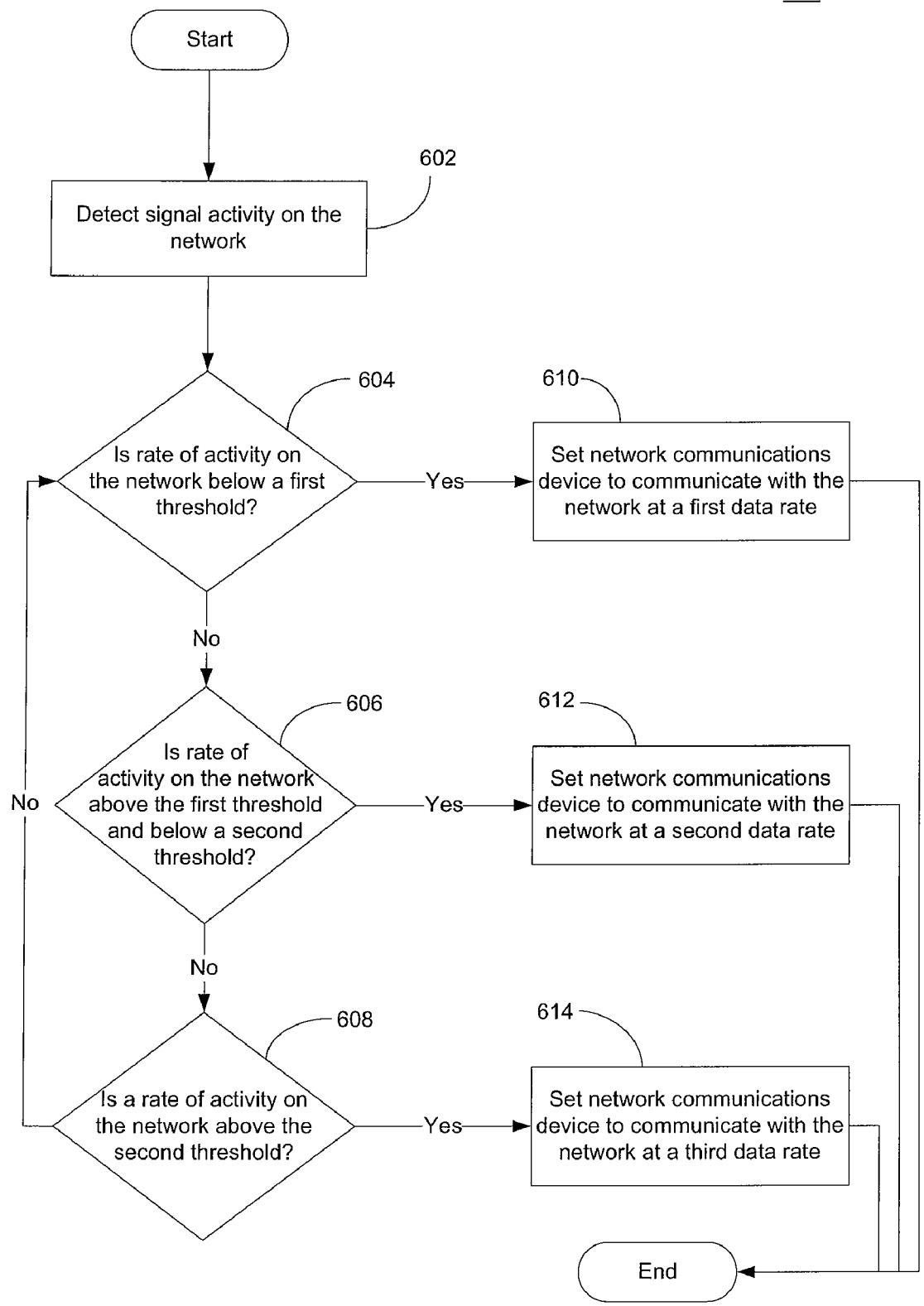
FIG. 6 is a flow chart of a process for automatically interfacing a network communications device with an Ethernet communications network.

FIG. 6 is a flow chart of a process for automatically interfacing a network communications device (e.g., a device including a PHY-MAC 404) with an Ethernet communications network. The process includes detecting signal activity on the network (602), e.g., with the autodetect block 430 detecting activity on the network 220 or from a network connected device 414, 416, or 418. The process includes determining whether a rate of the activity on the network is below first threshold (604), determining whether a rate of the activity on the network is above the first threshold and below a second threshold (606), and determining whether a rate of the activity on the network is above the second threshold (608). The network communications device is set to communicate with the network at a first data rate, if the rate of activity is below the first threshold (610). For example, the autodetect block 430 can cause the switch 424 to be positioned, such that transceiver circuitry is selected for communicating at the first data rate. The network communications device is set to communicate with the network at a second data rate, if the rate of activity is above the first threshold and below the second threshold (612). The network communications device is set to communicate with the network at a third data rate, if the rate of activity is above the second threshold. (614).

While various embodiments of the invention have been described as interfacing to an Ethernet network, other network protocols also can be used. Accordingly, various implementations may use PHYs with appropriate interfaces, for example, SerDes interface or CSMA/CD interface, for interfacing to different types of networks. The type of PHY interface used may be design and/or implementation dependent.

Implementations may be designed in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein. Implementations may provide a machine-readable storage, having stored thereon, a computer program having at least one code section executable by a machine, thereby causing the machine to perform steps of processes described herein.

Implementations may also be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, a data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. The processor and the memory may be supplemented by, or incorporated in special purpose logic circuitry.

Thus, while certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. An apparatus comprising:
first transceiver circuitry adapted for transmitting and receiving Ethernet data over a network using a first Ethernet communication protocol operating at a first data rate;
second transceiver circuitry adapted for transmitting and receiving Ethernet data over a network using a second Ethernet communication protocol operating at a second data rate; and
third transceiver circuitry adapted for transmitting and receiving Ethernet data over a network using a third Ethernet communication protocol operating at a third data rate, wherein the first transceiver circuitry comprises a first voltage controlled oscillator having a reference voltage set to a first reference level, wherein the second transceiver circuitry comprises a second voltage controlled oscillator having a reference voltage set to a second reference level, and wherein the third transceiver circuitry comprises a third voltage controlled oscillator having a reference voltage set to a third reference level.

2. The apparatus of claim 1, further comprising a switch operably connected to the first, second, and third transceiver circuitries and adapted for selecting one of the first, second, or third circuitries for transmitting and receiving Ethernet data.

3. The apparatus of claim 1, further comprising a plurality of connectors adapted for transmitting and receiving Ethernet data over the network using the first Ethernet communication protocol at the first data rate, for transmitting and receiving Ethernet data over the network using the second Ethernet communication protocol at the second data rate, and for transmitting and receiving Ethernet data over the network using the third Ethernet communication protocol at the third data rate.

4. The apparatus of claim 1, wherein the first data rate is about 1.0 Gigabits per second, the second data rate is about 2.5 Gigabits per second, and the third data rate is about 10 Gigabits per second.

5. The apparatus of claim 1, wherein the first Ethernet communication protocol is selected from the group consisting of 1000BASE-X protocols, wherein the second Ethernet communication protocol is selected from the group consisting of XAUI protocols, and wherein the third Ethernet communication protocol is selected from the group consisting of 10GBASE-R protocols.

6. The apparatus of claim 1, wherein the first transceiver circuitry, the second transceiver circuitry, and the third transceiver circuitry comprise a Serializer-Deserializer.

7. The apparatus of claim 1, further comprising backplane circuitry configured to transmit Ethernet data between a plurality of processing devices and configured to receive the transmitted Ethernet data from the first, second or third transceiver circuitry for transmission to at least one of the processing devices.

8. The apparatus of claim 1, further comprising:
a plurality of processors; and
backplane circuitry configured to transmit Ethernet data between the plurality of processors and configured to receive the transmitted Ethernet data from the first, second or third transceiver circuitry for transmission to at least one of the processors.

9. The apparatus of claim 1, wherein the first transceiver circuitry comprises a phase-locked loop, wherein the second transceiver circuitry comprises the phase-locked loop, and wherein the third transceiver circuitry comprises the phase-locked loop, and wherein the phase-locked loop is adapted to provide a first clock signal to clock the first transceiver circuitry at the first data rate, a second clock signal to clock the second transceiver circuitry at the second data rate, and a third clock signal to clock the third transceiver circuitry at the third data rate.

10. A method of automatically interfacing a network communications device with an Ethernet communications network, the method comprising:
detecting signal activity on the network;
determining whether a rate of the activity on the network is below first threshold;
determining whether a rate of the activity on the network is above the first threshold and below a second threshold;
determining whether a rate of the activity on the network is above the second threshold;
setting the network communications device to communicate with the network at a first data rate, if the rate of activity is below the first threshold;
setting the network communications device to communicate with the network at a second data rate, if the rate of activity is above the first threshold and below the second threshold; and
setting the network communications device to communicate with the network at a third data rate, if the rate of activity is above the second threshold;
wherein setting the network communications device to communicate with the network at the first data rate comprises setting a reference voltage of a first voltage controlled oscillator to a first reference level;
wherein setting the network communications device to communicate with the network at the second data rate comprises setting a reference voltage of a second voltage controlled oscillator to a second reference level; and
wherein setting the network communications device to communicate with the network at the third data rate comprises setting a reference voltage of a third voltage controlled oscillator to a third reference level.

11. The method of claim 10, wherein the first data rate is about 1.0 Gigabits per second, the second data rate is about 2.5 Gigabits per second, and the third data rate is about 10 Gigabits per second.

12. The method of claim 10, wherein communication with the network at the first data rate comprises communication using an Ethernet communication protocol selected from the group consisting of 1000BASE-X protocols, wherein communication with the network at the second data rate comprises communication using an Ethernet communication protocol selected from the group consisting of XAUI protocols, and wherein communication with the network at the third data rate comprises communication using an Ethernet communication protocol selected from the group consisting of 10GBASE-R protocols.

13. The method of claim 10, wherein the network communications device comprises a SerDes link.

14. The method of claim 10, wherein the communications network comprises backplane circuitry configured to transmit Ethernet data between a plurality of blade servers.

15. An apparatus comprising:
at least one voltage controlled oscillator;
first transceiver circuitry adapted for transmitting and receiving Ethernet data over a network using a first Ethernet communication protocol operating at a first data rate wherein the at least one voltage controlled oscillator has a reference voltage set to a first reference level for operating at the first data rate;

second transceiver circuitry adapted for transmitting and receiving Ethernet data over a network using a second Ethernet communication protocol operating at a second data rate wherein the at least one voltage controlled oscillator has a reference voltage set to a second reference level for operating at the second data rate;

third transceiver circuitry adapted for transmitting and receiving Ethernet data over a network using a third Ethernet communication protocol operating at a third data rate wherein the at least one voltage controlled oscillator has a reference voltage set to a third reference level for operating at the third data rate, wherein the first transceiver circuitry comprises a phase-locked loop, wherein the second transceiver circuitry comprises the phase-locked loop, and wherein the third transceiver circuitry comprises the phase-locked loop, and wherein the phase-locked loop is adapted to provide a first clock signal to clock the first transceiver circuitry at the first data rate, a second clock signal to clock the second transceiver circuitry at the second data rate, and a third clock signal to clock the third transceiver circuitry at the third data rate.

16. The apparatus of claim 15, wherein the at least one voltage controlled oscillator comprises a first voltage controller oscillator, a second voltage controlled oscillator, and a third voltage controller oscillator.

17. The apparatus of claim 15, further comprising a switch operably connected to the first, second, and third transceiver circuitries and adapted for selecting one of the first, second, or third circuitries for transmitting and receiving Ethernet data.

18. The apparatus of claim 15, further comprising a plurality of connectors adapted for transmitting and receiving Ethernet data over the network using the first Ethernet communication protocol at the first data rate, for transmitting and receiving Ethernet data over the network using the second Ethernet communication protocol at the second data rate, and for transmitting and receiving Ethernet data over the network using the third Ethernet communication protocol at the third data rate.

19. The apparatus of claim 15, wherein the first data rate is about 1.0 Gigabits per second, the second data rate is about 2.5 Gigabits per second, and the third data rate is about 10 Gigabits per second.

20. The apparatus of claim 15, wherein the first Ethernet communication protocol is selected from the group consisting of 1000BASE-X protocols, wherein the second Ethernet communication protocol is selected from the group consisting of XAUI protocols, and wherein the third Ethernet communication protocol is selected from the group consisting of 10GBASE-R protocols.

21. The apparatus of claim 15, wherein the first transceiver circuitry, the second transceiver circuitry, and the third transceiver circuitry comprise a Serializer-Deserializer.

22. The apparatus of claim 13, further comprising backplane circuitry configured to transmit Ethernet data between a plurality of processing devices and configured to receive the transmitted Ethernet data from the first, second or third transceiver circuitry for transmission to at least one of the processing devices.

23. The apparatus of claim 15, further comprising:
a plurality of processors; and
backplane circuitry configured to transmit Ethernet data between the plurality of processors and configured to receive the transmitted Ethernet data from the first, second or third transceiver circuitry for transmission to at least one of the processors.

24. A method of automatically interfacing a network communications device with an Ethernet communications network, the method comprising:
detecting a rate of signal activity on the network;
setting the network communications device to communicate with the network at one of a plurality of data rates based on the rate of signal activity;
wherein setting the network communications device to communicate with the network at one of a plurality of data rates comprises setting a reference voltage of a voltage controlled oscillator (VCO) to an associated reference level, with a different VCO reference level being used for each of the plurality of data rates.

25. The method of claim 24, wherein the plurality of data rates comprises a first data rate of about 1.0 Gigabits per second, a second data rate of about 2.5 Gigabits per second, and a third data rate of about 10 Gigabits per second.

26. The method of claim 24, wherein the plurality of data rates comprises two or more of the following: an Ethernet 1000BASE-X protocol, an Ethernet XAUI protocol, and an Ethernet 10GBASE-R protocol.

27. The method of claim 24, wherein the network communications device comprises a SerDes link.

28. The method of claim 24, wherein the communications network comprises backplane circuitry configured to transmit Ethernet data between a plurality of blade servers.

29. An apparatus comprising:
a transceiver circuitry adapted for transmitting and receiving Ethernet data over a network using a selected one of a plurality of Ethernet communications protocols, each of the Ethernet protocols operating at a different data rate, the plurality of data rates including at least a first data rate and a second data rate;
the transceiver circuitry including a voltage controlled oscillator having a reference voltage set to a first reference level when an Ethernet communications protocol having a first data rate is selected for transmitting and receiving data, and the voltage controlled oscillator having a reference voltage set to a second reference level when a when an Ethernet communications protocol having a second data rate is selected for transmitting and receiving data.

30. The apparatus of claim 29 and further wherein the voltage controlled oscillator having a reference voltage set to a third reference level when a when an Ethernet communications protocol having a third data rate is selected for transmitting and receiving data.

* * * * *

UNITED STATES PATENT AND TRADEMARK OFFICE
CERTIFICATE OF CORRECTION

| | |
|---|---|
| PATENT NO. | : 8,130,786 B2 |
| APPLICATION NO. | : 12/112785 |
| DATED | : March 6, 2012 |
| INVENTOR(S) | : Michael Furlong et al. |

It is certified that error appears in the above-identified patent and that said Letters Patent is hereby corrected as shown below:

In column 13, line 56, in claim 22, delete "13," and insert -- 15, --, therefor.

In column 14, line 48-49, in claim 29, after "level" delete "when a".

In column 14, line 54, in claim 30, after "level" delete "when a".

Signed and Sealed this
Twenty-ninth Day of May, 2012

David J. Kappos
*Director of the United States Patent and Trademark Office*